May 13, 1947.  S. W. BRIGGS  2,420,414
FILTER CONSTRUCTION
Filed Sept. 21, 1943
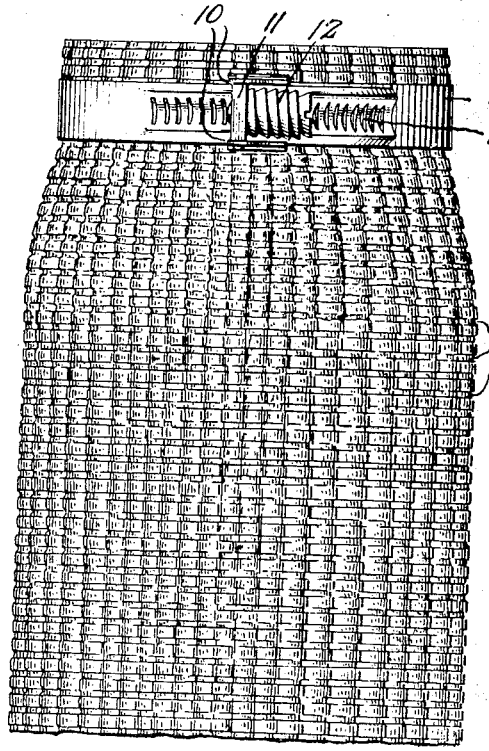
Fig. 1.
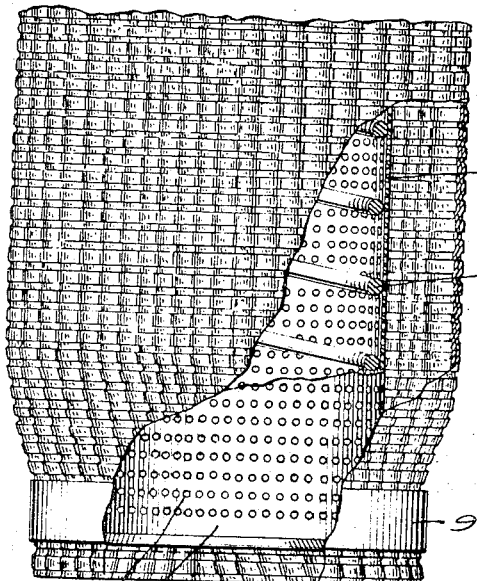
Fig. 2.
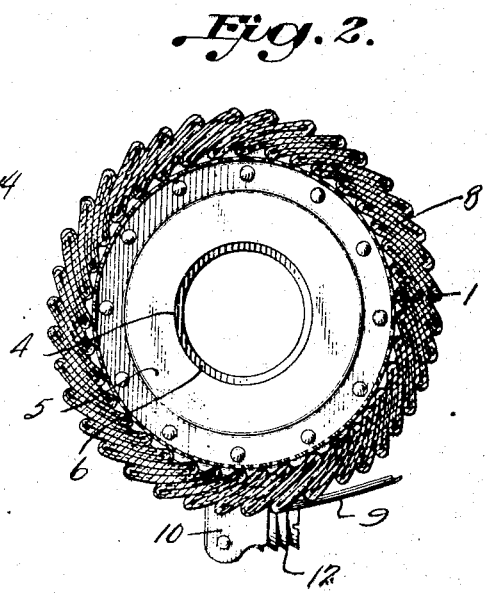
Fig. 3.
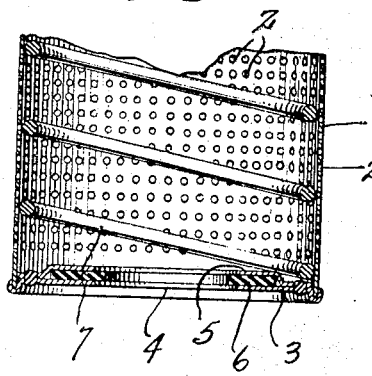
Inventor
SOUTHWICK W. BRIGGS
By Semmes Keegin Beale & Semmes
Attorneys Patented May 13, 1947

2,420,414

UNITED STATES PATENT OFFICE 2,420,414

FILTER CONSTRUCTION

Southwick W. Briggs, Washington, D. C.

Application September 21, 1943, Serial No. 503,262

5 Claims. (Cl. 210—169)

This invention relates to filter elements and more particularly has reference to filter elements which are adapted to be detachably mounted in filters or clarifiers so that they can be replaced when exhausted.

Various types of filter elements have been made, a number of which comprise a foraminous tubular member on which is mounted the filter material and which is permanently secured thereto by cement or other means. When such a filter element is exhausted by the pores thereof becoming clogged with sludge or by being otherwise rendered unfit for further service, the same is usually removed from the filter or clarifier and discarded, a new unit being substituted therefor.

Since it is only the filter material itself which becomes exhausted or unfit for further use, it is obvious that the other parts of the filter unit, that is, the support for the filter material is unnecessarily discarded in the constructions heretofore provided.

An object of this invention is to provide a filter unit for use in clarifiers and filters composed of folded filter material and a tubular support therefor, the filter material being detachably secured to the support for removal and replacement when exhausted.

A further object of this invention is to provide a filter unit composed of a tubular foraminous member about which a tubular body of folded cellulosic material is arranged and means for detachably binding the cellulosic material adjacent its ends to the foraminous tubular member in liquid-tight engagement therewith to prevent material being filtered by passing the cellulose material.

Still another object of this invention is to provide a filter unit composed of a tubular foraminous support member about which is positioned a tubular body of cellulosic filter material formed of a web of cellulosic material folded in zig-zag formation to provide a plurality of stretches of the web extending substantially radially between the inner and outer surfaces of the filter body and means for detachably binding the ends of said body to the corresponding ends of the tubular member.

With these and other objects in view, the present invention resides in the parts and combinations shown in the drawings and hereinafter described.

In order to facilitate an understanding of the present invention, reference is made to the accompanying drawings in which:

Figure 1 is an elevational view of a filter element constructed in accordance with the present invention.

Figure 2 is a cross sectional view of the filter element shown in Figure 1 of the drawings.

Figure 3 is a fragmentary longitudinal sectional view of a foraminous tubular member employed in the filter element of the present invention.

The filter unit according to the present invention comprises a core 1 in the form of a foraminous tubular member having a plurality of apertures 2 formed in the cylindrical wall thereof. The tubular member 1 has end plates 3 secured to each end thereof provided with central apertures 4 for the reception of a clarified oil discharge pipe associated with a clarifier or filter with which the filter unit is to be used. It will be noted that the end members 3 have dished plates 5 secured to the inner surfaces thereof which cooperate with the end plates 3 to form recesses for the reception of gasket-like washers 6 which are adapted to closely engage with the clarified liquid pipe of the filter on which the filter unit is detachably mounted and prevent leakage of the clarified oil past the end plates.

A wire member 7 in the form of a helix is provided on the interior of the foraminous tubular member 1 to increase the crushing strength of the tubular member.

About the outer cylindrical surface of the tubular member 1 there is positioned a filter body 8 which is of tubular formation and which as shown in the drawings is constructed of a web of cellulosic material which is folded in zig-zag or Z fashion. The ends of the web of cellulosic material are joined to form the tubular body with certain of the folds of the material lying in the outer surface of the body and other folds of the material lying in the inner surface of the said body. With this construction, the stretches of the cellulosic web between the inner and outer surfaces of the filter body 8 will lie substantially radially of the body and will form a filter somewhat similar to that shown and described in co-pending application Serial No. 437,058, filed March 31, 1942. The present invention differs primarily from that described and claimed in the above-mentioned application Serial No. 437,058 in the manner in which the cellulosic filter body is secured to the foraminous tubular member or core 1. In accordance with the present invention, the ends of the filter body 8 are brought into intimate contact with the corresponding ends of the foraminous member 1 by overlapping adjacent stretches of the web as illustrated in Figure 2 of the drawings. A clamp 9 is then placed about the end of the filter body 8 and tightened to securely bind this end of the filter body to the corresponding end of the foraminous tubular member. As shown in the drawings, one end of the clamp 9 is provided with a pair of ears 10 between which is pivotally mounted a support 11 which carries a screw 12 having buttress type threads. The screw is rotatably mounted in the support 11 and its threads are adapted to cooperate with thread-like indentations 13 formed in the other end of the clamping band 9. With this construction, it will be appreciated that by turning the screw 12 in the proper direction, the desired degree of tension may be effected on the band 9 to effectively bind or seal the clamped end of the cellulosic filter member to the corresponding end of the foraminous tubular member.

Both ends of the filter member are bound to the corresponding ends of the foraminous core 1 as illustrated in the drawings to form the composite filter unit.

It will be noted that the cellulosic material of which the filter member 8 is formed is provided with grooves 14. When the stretches of the material overlap, as shown in Figure 2, these grooves 14 in adjacent stretches cooperate to provide flow channels for the oil which effect a free flow distribution of the oil over substantially the whole filter area of the material.

A filter unit constructed in accordance with the present invention as hereinbefore described may be mounted upon the filter unit supporting tube in a filter or clarifier which usually is a perforated tube adapted to enter into the interior of the filter unit and receive the clarified liquid which flows radially through the filter unit. In ordinary practice after the filter becomes clogged or otherwise unfit for further use, it is removed and the filter material as well as the core which supports the same are discarded. In accordance with the present invention, however, a filter unit which has been removed from a filter or clarifier may be disassembled by removing the clamps 9 from the ends thereof, the tubular filter member 8 removed and discarded and a new filter member assembled in position on the foraminous core 1. After properly securing the new filter member 8 in place on the core 1 the unit is ready for reassembly in the filter or clarifier. It will be obvious that the present invention will provide a great saving over prior practice since the foraminous cores may be used repeatedly as distinguished from discarding them as in prior practice.

I claim:

1. A clarifier unit comprising a foraminous tubular member for assembly in a clarifier, a filter element in the form of a tubular body comprising an elongated web of filter material folded to extend back and forth between the inner and outer peripheral surfaces of the tubular body with the folds thereof extending longitudinally of the tubular body, the folds of the web at the inner surface of the tubular body being juxtaposed, and a constrictable annular clamping member adjacent opposite ends of the filter body detachably securing the filter element to the foraminous tubular member about the exterior of the latter.

2. A clarifier unit comprising a foraminous tubular member for assembly in a clarifier, a cellulosic filter element in the form of a tubular body comprising an elongated web of cellulosic filter material folded to extend back and forth between the inner and outer peripheral surfaces of the tubular body with the folds thereof extending longitudinally of the tubular body, the folds of the web at the inner surface of the tubular body being juxtaposed, said filter element surrounding the tubular member, and circumferentially adjustable means surrounding the filter element at each of its ends and detachably binding said ends of the filter element to the foraminous tubular member.

3. A clarifier unit comprising a foraminous tubular member for assembly in a clarifier, a cellulosic filter element in the form of a tubular body comprising an elongated web of cellulosic filter material folded to extend back and forth between the inner and outer peripheral surfaces of the tubular body with the folds thereof extending longitudinally of the tubular body, the folds of the web at the inner surface of the tubular body being juxtaposed, said filter element surrounding the tubular member and detachable adjustable clamping elements surrounding the filter element at its ends and binding said ends of the filter element to the foraminous tubular member.

4. A clarifier unit comprising a foraminous tubular member for assembly in a clarifier, a cellulosic filter element in the form of a tubular body comprising an elongated web of cellulosic filter material folded to extend back and forth between the inner and outer peripheral surfaces of the tubular body with the folds thereof extending longitudinally of the tubular body, the folds of the web at the inner surface of the tubular body being juxtaposed and joined together, said web having grooves in the surfaces thereof extending generally radially of the tubular body for forming flow passages between the contacting surfaces of stretches of said web extending between the inner and outer surfaces of the tubular body, said filter element surrounding the tubular member, and detachable means constricting the ends of said filter body into binding engagement with the corresponding ends of the tubular member.

5. A clarifier unit comprising a foraminous tubular member for assembly in a clarifier, a cellulosic filter element in the form of a tubular body comprising an elongated web of cellulosic filter material folded to extend back and forth between the inner and outer peripheral surfaces of the tubular body with the folds thereof extending longitudinally of the tubular body, the folds of the web at the inner surface of the tubular body being juxtaposed, said filter element surrounding the tubular member, at least the ends of the stretches of the web between inner and outer surfaces of the filter element being wrapped about the foraminous tubular member in overlapping relation with each other, and detachable binding means surrounding the wrapped end portions of the filter element for binding it to the foraminous tubular member.

SOUTHWICK W. BRIGGS.

REFERENCES CITED

The following references are of record in the file of this patent:

UNITED STATES PATENTS

| Number | Name | Date |
|---|---|---|
| 965,010 | Polk | July 19, 1910 |
| 1,565,988 | Cottrell | Dec. 15, 1925 |
| 2,239,868 | Williams | Apr. 29, 1941 |

(Other references on following page)

UNITED STATES PATENTS

| Number | Name | Date |
|---|---|---|
| 47,261 | Simmons | Apr. 11, 1865 |
| 934,076 | Kneuper | Sept. 14, 1909 |
| 1,751,000 | Goldman | Mar. 18, 1930 |
| 2,279,423 | Vokes | Apr. 14, 1942 |
| 2,092,548 | Briggs | Sept. 7, 1937 |
| 2,321,985 | Briggs | June 15, 1943 |
| 616,479 | Martin | Dec. 27, 1898 |
| 410,767 | Pierce | Sept. 10, 1889 |
| 231,066 | Long | Aug. 10, 1880 |
| 559,440 | Conrader | May 5, 1896 |
| 2,035,758 | Pierce | Mar. 31, 1936 |
| 1,148,237 | Kneuper | July 27, 1915 |
| 1,992,505 | Prosky | Feb. 26, 1935 |
| 2,189,172 | Hathorn | Feb. 6, 1940 |
| 1,145,372 | Krause | July 6, 1915 |
| 609,769 | Barr | Aug. 30, 1898 |

FOREIGN PATENTS

| Number | Country | Date |
|---|---|---|
| 1,382 | Great Britain | A. D. 1853 |
| 401,287 | Great Britain | Oct. 30, 1933 |
| 16,237 | Great Britain | A. D. 1907 |